United States Patent
Britton

(10) Patent No.: US 6,413,468 B1
(45) Date of Patent: Jul. 2, 2002

(54) RELATING TO CONTAINERS

(76) Inventor: Charles Jonathan Britton, 19, High Street, Avening, Tetbury, Gloucestershire. GL8 8NF (GB)

( * ) Notice: Subject to any disclaimer, the term of this patent is extended or adjusted under 35 U.S.C. 154(b) by 0 days.

(21) Appl. No.: 09/077,528
(22) PCT Filed: Nov. 29, 1996
(86) PCT No.: PCT/GB96/02938
§ 371 (c)(1), (2), (4) Date: Feb. 8, 1999
(87) PCT Pub. No.: WO97/19801
PCT Pub. Date: Jun. 5, 1997

(30) Foreign Application Priority Data

Nov. 30, 1995 (GB) .............................. 9524553

(51) Int. Cl.[7] .............................. B29C 49/06; B65D 1/02
(52) U.S. Cl. .................. 264/537; 264/318; 215/40; 215/42; 215/43
(58) Field of Search .................. 264/537, 533, 264/318; 425/525; 215/40, 42, 43

(56) References Cited

U.S. PATENT DOCUMENTS

| | | | |
|---|---|---|---|
| 3,482,724 A | * 12/1969 | Heaton | 215/10 |
| 4,367,821 A | 1/1983 | Holt | 220/72 |
| 4,941,815 A | * 7/1990 | Julian | 425/525 |
| 5,117,993 A | * 6/1992 | Vesborg | 215/382 |
| 5,297,686 A | * 3/1994 | Takeuchi | 215/396 |

* cited by examiner

Primary Examiner—Suzanne E. McDowell
(74) Attorney, Agent, or Firm—Foley & Lardner

(57) ABSTRACT

A container is made in two stages from thermoplastics material. In the first stage a preform (1) is injection molded, the mold parts easily releasing a tubular body (2) with a closed end and an outwardly projecting rim (3) at the open end. In the second stage the still heated preform (1) is blow molded, possibly with some preliminary mechanical stretching, with the blow pin (13) seated in the open end of the body (2) and the preform (1) held by the outer part (7) of its rim. The wall of the body (2) is expanded, and immediately be low the open end it is stretched outwardly to meld with the underside of the inner part (5) of the rim. The resultant container thus has a mouth defined by an inset lip. It may be of paint tin form, with a drip groove (9) around the mouth.

14 Claims, 1 Drawing Sheet

RELATING TO CONTAINERS

This invention relates to containers, and is particularly concerned with a method of manufacture of containers that resemble tins with press-in lids which can be levered off using the rim of the container as a fulcrum. These have traditionally been produced in metal, and have been widely used for such contents as paint, drinking chocolate and cornflour.

Versions in plastics material have been manufactured, and hitherto they have been produced by welding together two discrete mouldings. The reason for this two-piece construction is the inward overhang of the top flange or rim. If known injection moulding methods are employed, it has been considered impossible to arrange it so that the inside male core can be extracted. The opening is too small to permit any form of collapsible insert. Blow moulding might offer a solution, but the problem with the rim has not been solved.

It is the aim of this invention to overcome this difficulty and to enable such a container to be made by blow moulding.

According to one aspect of the present invention there is provided a method of making a container to which entry is via an opening inset from adjacent container walling, the material of the container being susceptible to deformation when heated, wherein in a first stage an embryo container is formed with a rim defining an opening projecting outwardly from what is to become the container walling, and wherein in a second stage that embryo container walling, at an elevated temperature, is urged outwardly while the rim is held, whereby the walling expands to leave the inner part of the rim inset therefrom.

It will be assumed hereafter that both the embryo and finished container are in an upright attitude with the opening uppermost.

The formation of the embryo container in the first stage is conveniently by injection moulding using an inner mould core which is subsequently extractable through said opening, while the transformation from embryo to finished container in the second stage is preferably by blow moulding via the opening, although at least some of the distortion or stretching inherent in the process could be achieved mechanically.

In the preferred form, the opening of the embryo container widens towards the mouth, locally thinning the container walling. The rim may then include a lateral flange projecting outwardly from the portion of thinned walling, this thinned portion being deformed in the second stage to co-operate with the underside of the flange. The embryo container also preferably has a further flange on the lateral flange, projecting downwardly to surround the opening end of the container, and the deformation of the thinned portion extends to it being forced against the inside of the further flange and to step out below its free edge.

With this arrangement, and if the material of the container is transparent, a data band can be provided on the inside of the further flange of the embryo container to be legible therethrough, the band being made captive by the deformed thinned portion.

Conveniently, at the root of the lateral flange there is an upstanding rib which internally smoothly continues the contour of the mouth of the opening. Also, at the outer edge of the lateral flange there may be, on the upper side, a stepped extension forming with said rib an upwardly open channel around the opening. The stepped extension may project laterally beyond the flanges, its underside providing means for locating the embryo container during the blow moulding.

According to another aspect of the present invention there is provided a container made by the method outlined above.

For a better understanding of the invention, one embodiment will now be described, by way of example, with reference to the accompanying drawing, in which.

Figure 1:
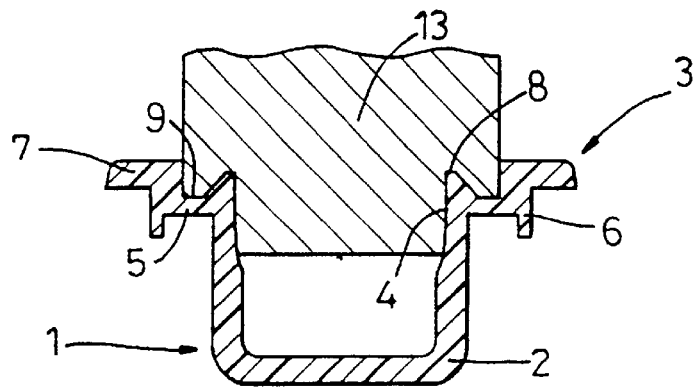
FIG. 1 is an axial section of a preform of a container prior to blow moulding.

A preform or embryo container 1 has a flat bottomed, bowl shaped body 2 with an outwardly projecting ring 3 at the mouth of the body 2. It is of plastics material formed by injection moulding, and its shape is such that the mould can be of just two parts which, when the plastics has set, can be separated by movement in the axial direction to release the preform 1. There are no undercuts to complicate the mould.

Towards the top of the body 2, its cylindrical wall becomes thinner, tapering in a smooth concave curve 4 on the inside to about half the thickness of the rest of the body 2. Projecting radially outwards from this the ring 3 has a flange 5, and at the outer periphery of this flange there is a further flange 6 projecting downwardly as a co-axial cylindrical skirt. The ring 3 also has a stepped extension 7 projecting above the flange 5 and radially beyond the flange 6. At the root of the flange 5, there is an upstanding annular rib 8 which internally smoothly merges into the curved surface 4. Externally, it slopes down into a channel 9 whose outer side is defined by the extension 7.

For blow moulding, the preform is transferred to a blow mould while still hot. The blow mould comprises two halves 10 and 11 with a base insert or punt 12. The preform rests by its extension 7 on the edge of the mould cavity and the flange 6 fits snugly in the mouth of that cavity. These parts are cooled quicker than the rest and so solidify enough to provide firm support and location. A blow pin 13 is shaped snugly to fit the groove 9, the rib 8 and the upper part of the curved surface 4, and its contact with the plastics material contributes to the local cooling and solidification.

Figure 2:
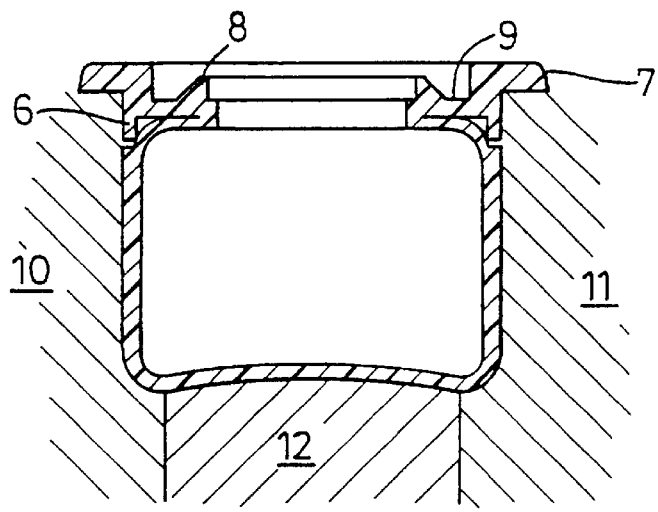
FIG. 2 is an axial section of a container in a mould having been expanded by blow moulding from the preform of FIG. 1.
Figure 3:
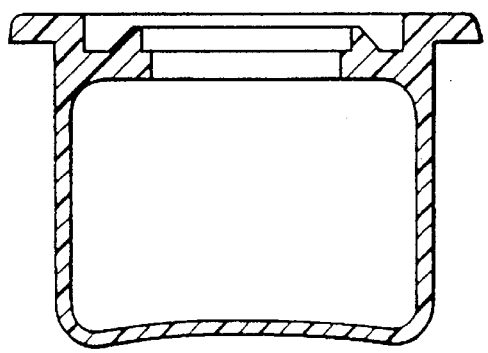
FIG. 3 is an axial section of the finished released container.

Air under pressure is then introduced through the blow pin. With the rest of the plastics material still soft and pliable, the thinned portion of its wall near the top is stretched and expanded radially, so that it is forced against the underside of the flange 5 and the inside of the flange 6. It then flows around the underside of that flange 6 to meet the wall of the blow mould cavity. The rest of the body 2 expands and eventually, with blowing complete, the container is as shown in FIG. 2. The heat is such that where two plastics surfaces have been urged together they become effectively homogeneous. The finished container is therefore as shown in FIG. 3. As soon as the material is cooled and set, the blow mould halves 10 and 11 are opened and the blow pin 13 is retracted to free the complete moulding.

It will be seen that the finished container resembles a conventional paint tin with the channel 9 for drips, and the extension 7 providing a fulcrum for levering off a lid pressed into the opening whose mouth is defined by the rib 8.

The most common shape of the finished container will be cylindrical. However, it would be possible to apply this technique to other shapes, for example elliptical in cross-section or even polygonal.

Various plastics materials are suitable, including polyvinyl chloride, high density polythene, polypropylene, acrylic or polycarbonate. Since the one-piece construction offers savings, more expensive materials such as polyethylene terepthalate (P.E.T.), polyethylene napthalate (P.E.N.) and copolymers and blends of these two materials in both crystalline and amorphous forms could be viable.

While blow moulding is expected to be the preferred method of expansion, aided by mechanical stretching for large containers, it may be possible to achieve the same effect by suction moulding.

What is claimed is:

1. A method of making a container to which entry is via an opening inset from adjacent container walling, the container being constructed of a material susceptible to deformation when heated, wherein in a first stage an embryo container is formed with a ring defining the opening substantially in its final form and with the portion other than the ring, which portion is to become the container walling, of reduced size compared with its final form, and wherein in a second stage that embryo container walling, at an elevated temperature, is urged outwardly by blow moulding while the ring is held, whereby the walling expands laterally in relation to the opening, characterised in that the ring provides a seat for a press-in lid and projects outwardly from the embryo container walling, the ring having an inner zone and an outer zone, the outer zone supporting the container during blow moulding, and in that the blow pin enters closely into the opening and the embryo container walling to substantially below the ring whereby, on being blown, the upper end section of the container waling is urged outwardly and upwardly to co-operate with the underside of the inner zone, thereby effectively doubling that inner zone.

2. A method of making a container as claimed in claim 1, characterised in that the formation of the embryo container in the first stage is by moulding in a two part mould one part of which has a core subsequently extractable through said opening.

3. A method of making a container as claimed in claim 2, characterised in that the formation of the embryo container is by injection moulding.

4. A container made by the method of claim 2.

5. A method of making a container as claimed in claim 1, characterised in that the opening of the embryo container widens upwardly, locally thinning the container walling, this thinned portion being deformed in the second stage to co-operate with the underside of said inner zone.

6. A container made by the method of claim 5.

7. A method of making a container as claimed in claim 1, characterised in that the ring has a flange between the inner and outer zones, projecting down to surround said upper end section.

8. A method of making a container as claimed in claim 7, characterised in that the deformation of the upper end section causes it to be forced out against the inside of said flange and to step out below its free edge.

9. A method of making a container as claimed in claim 8, characterised in that the material of the container is transparent and a data band is provided on the inside of said flange of the embryo container to be legible therethrough, the band being made captive by the upper end section when that is deformed.

10. A container made by the method of claim 7.

11. A method of making a container as claimed in claim 1, characterised in that the ring has a peripheral upwardly open channel with an inner wall defined by an upstanding rib and an outer wall by said outer zone, which is upwardly stepped in relation to the inner zone.

12. A method of making a container as claimed in claim 11, characterised in that the blow pin is shaped also to mate with the rib and the peripheral channel.

13. A container made by the method of claim 11.

14. A container made by the method of claim 1.

* * * * *